(12) United States Patent
Uppunda et al.

(10) Patent No.: US 11,880,353 B2
(45) Date of Patent: Jan. 23, 2024

(54) METHOD AND SYSTEM FOR HANDLING ENGINEERING DATA IN A MULTIENGINEERING SYSTEM ENVIRONMENT

(71) Applicants: Prashanth Uppunda, Karnataka (IN); Sezhiyan Thiagarajan, Karnataka (IN)

(72) Inventors: Prashanth Uppunda, Karnataka (IN); Sezhiyan Thiagarajan, Karnataka (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/058,735

(22) PCT Filed: May 28, 2019

(86) PCT No.: PCT/EP2019/063865
§ 371 (c)(1),
(2) Date: Nov. 25, 2020

(87) PCT Pub. No.: WO2019/229082
PCT Pub. Date: Dec. 5, 2019

(65) Prior Publication Data
US 2021/0216533 A1   Jul. 15, 2021

(30) Foreign Application Priority Data
May 28, 2018   (EP) .................................. 18174600

(51) Int. Cl.
*G06F 16/23* (2019.01)
*G06F 3/14* (2006.01)
*G06F 16/27* (2019.01)

(52) U.S. Cl.
CPC ............ *G06F 16/2379* (2019.01); *G06F 3/14* (2013.01); *G06F 16/27* (2019.01)

(58) Field of Classification Search
CPC ................. G06F 16/27; G06F 16/2379; G06F 16/24542; G06F 2111/02; G06F 3/14;
(Continued)

(56) References Cited

U.S. PATENT DOCUMENTS 9,122,647 B2 *   9/2015   Tian ...................... G06F 3/0604
9,871,796 B1   1/2018   Sowa et al.
(Continued)

OTHER PUBLICATIONS

Demuth, Andreas, Markus Riedl-Ehrenleitner, Alexander Nöhrer, Peter Hehenberger, Klaus Zeman, and Alexander Egyed. "DesignSpace: an infrastructure for multi-user/multi-tool engineering." In Proceedings of the 30th Annual ACM Symposium on Applied Computing, pp. 1486-1491. 2015.
(Continued)

*Primary Examiner* — Marcin R Filipczyk
(74) *Attorney, Agent, or Firm* — Lempia Summerfield Katz LLC (57) ABSTRACT

A method and system for handling engineering data in a multi-engineering-system environment is disclosed. The method includes receiving an engineering data from an engineering system. The engineering data corresponds to a data format common to one or more engineering disciplines. The method includes determining whether the engineering data matches with a reference engineering data and identifying one or more modifications in the engineering data by comparing the reference engineering data with the engineering data if the engineering data fails to match with the reference engineering data. The method includes generating a notification message including the identified one or more modifications in the engineering data in a predefined format. The method includes sending the notification message to one or more engineering systems based on one or more engineering applications running on the one or more engineering
(Continued)

systems. The one or more engineering applications correspond to the one or more engineering disciplines.

19 Claims, 8 Drawing Sheets

(58) Field of Classification Search
CPC .... G06F 16/273; G06F 16/275; G06F 16/278; G06F 9/541; G06F 16/2365; G06N 20/00; H04L 67/1097
See application file for complete search history.

(56) References Cited

U.S. PATENT DOCUMENTS

| | | | |
|---|---|---|---|
| 11,095,717 B2 * | 8/2021 | Gkoufas | ................ H04L 67/12 |
| 2012/0109590 A1 | 5/2012 | Trainer | |
| 2014/0278269 A1 | 9/2014 | Winn | |
| 2014/0317531 A1 * | 10/2014 | Bowman, Jr. | ........... G06F 30/00 |
| | | | 715/751 |
| 2015/0261782 A1 | 9/2015 | Mcferrin | |
| 2016/0125100 A1 * | 5/2016 | Han | ........................ G06F 30/00 |
| | | | 703/1 |
| 2018/0144817 A1 * | 5/2018 | Lofgren | ................. G16H 20/40 |
| 2020/0036737 A1 * | 1/2020 | Crawford | ............. G05B 19/058 |

OTHER PUBLICATIONS

European Office Action for European Application No. 18174600.9-1203 dated Aug. 16, 2021.
European Search Report for European Application No. 18174600.9-1221 dated Dec. 19, 2018.
International Preliminary Report on Patentability for International Patent Application PCT/EP2019/063865 dated Sep. 25, 2020.
International Search Report and the Written Opinion for International Patent Application PCT/EP2019/063865 dated Aug. 8, 2019.

* cited by examiner

METHOD AND SYSTEM FOR HANDLING ENGINEERING DATA IN A MULTIENGINEERING SYSTEM ENVIRONMENT

CROSS REFERENCE TO RELATED APPLICATIONS

This present patent document is a § 371 nationalization of PCT Application Serial Number PCT/EP2019/063865 filed May 28, 2019, designating the United States, which is hereby incorporated in its entirety by reference. This patent document also claims the benefit of EP 18174600.9 filed on May 28, 2018 which is also hereby incorporated in its entirety by reference

FIELD

Embodiments relate to multi-engineering system environment and to a method and system for handling engineering data in a multi-engineering system environment.

BACKGROUND

A multi-engineering system environment may include a number of multidisciplinary engineering systems that integrate multiple engineering disciplines, such as design engineering, electrical engineering, mechanical engineering, automation engineering, project management and the like, and allows engineers, technicians and managers from various disciplines to work on common or connected engineering data. For example, factory designers work together with mechanical engineers, electrical engineers, automation engineers and managers to plan a new production line for a car door assembly. In the multi-engineering-system, each discipline has its own representation of data. For example, the same device will be represented differently in each discipline, and different data regarding the device is stored depending on the discipline.

Each engineering discipline works separately from a data point of view. Therefore, manual synchronization of the discipline specific data is required, that is very time consuming and error prone. For example, when an electrical engineer modifies objects of an engineering project file such as adding additional input/output (I/O) modules to an existing LC rack, or removing a I/O module and exchanging it with a new type of I/O module, or adding additional I/O signals, changing type of I/O signals and so on, information about the change in specific engineering project file is manually transported to an automation engineering application in order for an automation engineer to adapt the specific changes made. If modified information is not transported, or the modified information is distorted during transport, the missing or incorrect information may impact the quality of the work of both the automation and electrical engineers.

US 2015/261782 discloses a method of syncing data in a backend system that provides services for supporting cloud-based software applications. This is achieved by providing the data storage service that is user-agnostic, and it may provide storage containers for use with any applications or users that have the respective unique IDs.

However, handling modifications made to the engineering data in a multi-engineering system environment still remain a challenge. In light of above, there is a need for an optimized method and system for handling engineering data in a multi-engineering-system environment.

SUMMARY AND DESCRIPTION

Embodiments provide a method and system for handling engineering data in a multi-engineering-system environment.

The scope of the present invention is defined solely by the appended claims and is not affected to any degree by the statements within this summary. The present embodiments may obviate one or more of the drawbacks or limitations in the related art.

Embodiments provide a method for handling engineering data in a multi-engineering-system environment. The method includes receiving an engineering data from an engineering system. The engineering data corresponds to a data format common to one or more engineering disciplines. In an embodiment, the data format common to one or more engineering disciplines may correspond to an Automation ML format. In an embodiment, the engineering data includes an engineering project file, an artifact, one or more object models, device information such as PLC's & I/O Modules, Signal list, network connection information and the like. The one or more engineering disciplines may include but not limited to electrical engineering, mechanical engineering, automation engineering and the like.

The method includes determining whether the engineering data matches with a reference engineering data. Further, the method includes identifying one or more modifications in the engineering data by comparing the reference engineering data with the engineering data if the engineering data fails to match with the reference engineering data. In an embodiment, the one or more modifications in the engineering data includes adding at least one engineering object, removing at least one engineering object, modifying engineering object properties, and the like. The reference engineering data is pre-stored in a memory. Further, the reference engineering data corresponds to last modified version of the engineering data received from one of the one or more engineering systems.

The method includes generating a notification message including the identified one or more modifications in the engineering data in a predefined format. In an embodiment, the predefined format may be engineering application specific. The method includes sending the notification message to one or more engineering systems based on one or more engineering applications running on the one or more engineering systems. The one or more engineering applications correspond to the one or more engineering disciplines. In an embodiment, the notification message is sent to the one or more engineering systems via a network.

In an embodiment, in sending the notification message to the one or more engineering systems based on the one or more engineering applications running on the one or more engineering systems, the method further includes determining the one or more engineering applications running on the one or more engineering systems and sending the notification message to one or more engineering systems based on the determined one or more engineering applications running on the one or more engineering systems. The one or more engineering systems are subscribed to receive the notification messages.

In an embodiment, the method further includes displaying the notification message on a user interface based on the one or more engineering applications running on the one or more engineering systems.

In an embodiment, the method includes updating the reference engineering data with the engineering data in a memory.

In an embodiment, the method further includes updating the engineering data stored locally in the one or more engineering systems with the identified one or more modifications based on a user confirmation.

In an embodiment, the method further includes receiving the engineering data from the one or more engineering systems. The engineering data includes a unique identifier. The method includes determining whether the unique identifier associated with the engineering data matches with at least one unique identifier stored in the memory. The method includes storing the engineering data with the unique identifier in the memory if the unique identifier associated with the engineering data fails to match with the at least one unique identifier stored in the memory.

In an embodiment, the method further includes sending a notification message to the one or more engineering systems. The notification message indicates that the engineering data is updated in the memory.

Embodiments provide a cloud system for handling engineering data in a multi-engineering-system environment. The cloud system includes a processor and a memory coupled to the processor. The memory includes a data handling module stored in the form of machine-readable instructions executable by the processor. The data handling module is configured for performing the method as described above.

Embodiments provide a multi-engineering system environment including a cloud system and one or more engineering systems communicatively coupled to the cloud system via a network.

Embodiments provide a computer-program product including machine-readable instructions stored therein, that when executed by a processor(s), cause the processor(s) to perform method steps as described above.

BRIEF DESCRIPTION OF THE FIGURES

The present invention is further described hereinafter with reference to illustrated embodiments shown in the accompanying drawings.

DETAILED DESCRIPTION

Various embodiments are described with reference to the drawings, where like reference numerals are used to refer the drawings, where like reference numerals are used to refer to like elements throughout. In the following description, for the purpose of explanation, numerous specific details are set forth in order to provide thorough understanding of one or more embodiments. It may be evident that such embodiments may be practiced without these specific details.

Embodiments provide a method and system for handling engineering data in a multi-engineering-system environment. Embodiments provide a cloud-based platform for handling engineering data in the multi-engineering-system environment. Embodiments handle change or modification management for an engineering data, such as engineering project commonly accessed across various engineering disciplines. Embodiments dynamically detect changes made to engineering data and notify the detected changes to one or more engineering systems. The notification including the specific changes made in the engineering data is communicated in a format compatible with engineering applications running on the engineering systems. The engineering applications may correspond to various engineering disciplines. Due to the process of dynamically detecting and notifying the specific changes made to the engineering data, manual errors is reduced and overall engineering efficiency is increased as the present invention achieves a better synchronization of engineering data between the various engineering systems.

Figure 1:
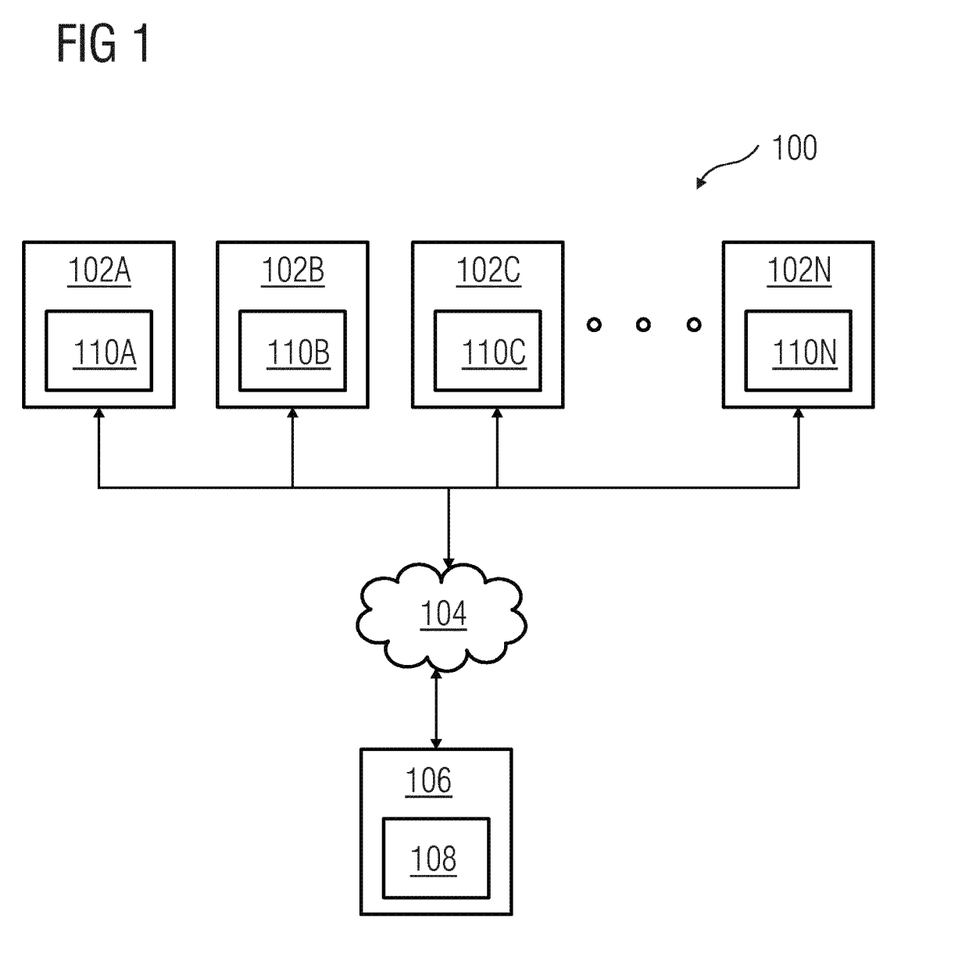
FIG. 1 depicts a schematic representation of a multi-engineering-system environment capable of handling engineering data, according to an embodiment.

FIG. 1 depicts a schematic representation of a multi-engineering-system environment 100 capable of handling engineering data. The multi-engineering-system environment 100 includes one or more engineering systems 102A-N communicatively coupled to a cloud system 106 via a network 104.

The one or more engineering systems 102A-N includes one or more engineering applications 110A-N respectively for various engineering disciplines. The engineering applications 110A-N are directed to layout design, electrical design, mechanical design, automation design, and business functions. The engineering applications 110A-N correspond to engineering disciplines, such as factory design, electrical engineering, mechanical engineering, automation engineering, and project management. Each engineering application 110A-N presents data differently, in a manner suited for the specific engineering discipline. The one or more engineering systems may further include a cloud interface for communicating with the cloud system 106 via the network 104. The cloud interface (not shown in FIG. 1) may allow the engineers at the one or more engineering systems 102A-N to access engineering data stored at the cloud system 106 and perform one or more actions on the engineering data.

Alternatively, at least one of the engineering applications 110A-N is directed to two or more engineering disciplines within a single application. Various engineers, designers, technicians, managers, and other users access the engineering applications 110A-N to complete tasks on the project. For example, in the context of an automobile factory, various engineers, designers and project managers plan a new production line for a car door assembly. In an embodiment, the one or more engineering systems 102A-N subscribes with the cloud system 106 for receiving notification messages regarding the modifications made to the engineering data.

The cloud system 106 is configured to provide cloud applications for managing engineering data in a multi-engineering-system environment. The cloud system 106 includes a data handling module 108 for handling the engineering data in a multi-engineering-system environment 100. In an embodiment, the cloud system 106 includes a cloud platform that implements functionalities such as data import/export, data processing, data storage, data analysis, data validation, data visualization, data communication via APIs and algorithms and delivers the aforementioned cloud services. The cloud platform may include a combination of dedicated hardware and software built on top of the cloud hardware and OS.

Figure 2:
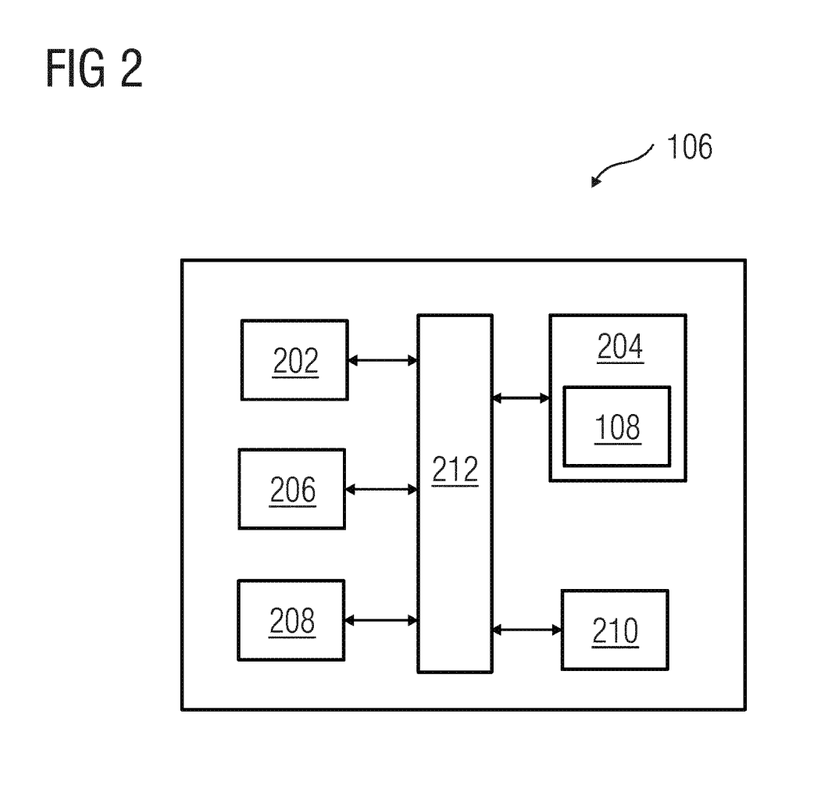
FIG. 2 depicts a block diagram of a cloud system according to an embodiment.

FIG. 2 depicts a block diagram of a cloud system 106, such as those shown in FIG. 1, in which an embodiment may be implemented. The cloud system 106 may be a personal computer, a laptop computer, a tablet, smart phone, and the like. In FIG. 1, the cloud system 106 includes a processor(s) 202, an accessible memory 204, a storage unit 206, a communication interface 208, an input/output unit 210, and a bus 212.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In an embodiment, the memory 204 includes a data handling module 108 stored in the form of machine-readable instructions on any of the above-mentioned storage media and may be in communication with and executed by the processor(s) 202.

Figure 7:
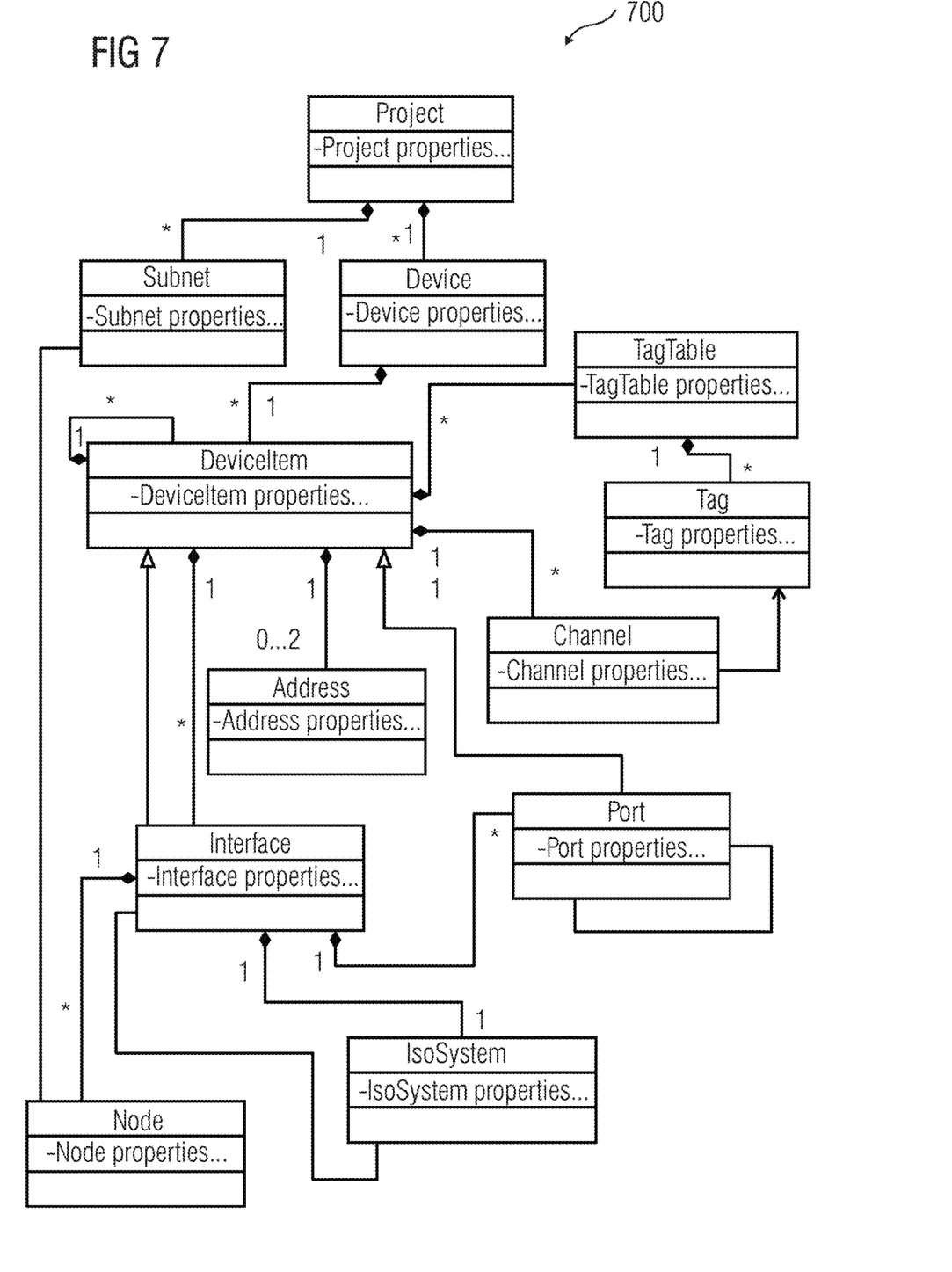
FIG. 7 depicts a hierarchical representation of Automation ML file, according to an embodiment.

When executed by the processor(s) 202, the data handling module 108 causes the processor(s) 202 to handle the engineering data in the multi-engineering-system environment 100. The data handling module 108 causes the processor(s) 202 to receive an engineering data from an engineering system, such as the one or more engineering systems 102A-N. The engineering data corresponds to a data format common to one or more engineering disciplines. In an embodiment, the engineering data corresponds to an Automation ML file of a specific engineering project. Further, the one or more engineering disciplines may be automation engineering, mechanical engineering, electrical engineering, and the like. The engineering data may be received through the import/export operation and via the network 104. In an embodiment, the data handling module 108 may include a web-based import/export service for causing the processor(s) to receive the engineering data from the engineering system. Upon receiving the engineering data, the data handling module 108 causes the processor(s) 202 to create an in-memory instance hierarchy of objects as per the object hierarchy of engineering data, for e.g., Automation ML object hierarchy. Hence, multiple instance hierarchies are created and maintained for each of the engineering data. An object hierarchy of the engineering data is depicted in FIG. 7.

The data handling module 108 causes the processor(s) 202 to store the engineering data in the storage unit 206.

The data handling module 108 causes the processor(s) 202 to identify the one or more modifications in the engineering data based on a reference engineering data. The one or more modifications in the engineering data includes adding at least one engineering object, removing at least one engineering object, modifying engineering object properties, and the like. The reference engineering data is pre-stored in the storage unit 206. The reference engineering data corresponds to last modified version of the engineering data received from one of the one or more engineering systems 102A-N.

In an embodiment, prior to identifying the one or more modifications in the engineering data, the data handling module 108 causes the processor(s) 202 to determine whether the engineering data matches with the reference engineering data pre-stored in the storage unit 206. If it is determined that the reference engineering data does not match with the engineering data, then the data handling module 108 causes the processor(s) 202 to identify the one or more modifications made in the engineering data by comparing the reference engineering data with the engineering data. The data handling module 108 causes the processor(s) 202 to update the reference engineering data with the engineering data in the storage unit 206 of the cloud system 106 upon identifying the one or more modifications.

In an embodiment, in identifying the one or more modifications in the engineering data, the data handling module 108 first retrieves the entire content of the engineering data. Then, the data handling module 108 classifies the content of the engineering data based on the type of engineering object. For example, the data handling module 108 classifies the content of the engineering data as Project-level data, device-level data, tag level data, interface level data and so on based on the type of engineering object contained in the engineering data. Later, each of the classified data of the engineering data is compared with the content of the reference engineering data. The content of the reference engineering data is similarly classified and stored based on the type of engineering data contained in the reference engineering data. For example, the content of the reference engineering data is classified as Project-level data, device-level data, tag level data, interface level data and so on based on the type of engineering object contained in the reference engineering data. Hence, the each of the classified data of the engineering data is compared with each of the classified data of the reference engineering data to identify the one or more modifications made in the engineering data. For example, the tag table of engineering data is compared with tag table of the reference engineering data to identify the exact tag being modified along with its properties. Similarly, an interface table of engineering data is compared with interface table of the reference engineering data to identify exact interface being modified along with its properties and so on. Upon comparison, the exact one or more modifications made to one or more engineering objects contained in the engineering data are identified.

Upon identifying the one or more modifications in the engineering data, the data handling module 108 further causes the processor(s) 202 to generate a notification message including the identified one or more modifications in the engineering data in a predefined format. In an embodiment, the predefined format includes engineering application specific format. The predefined format corresponds to a specific format compatible with the one or more engineering applications 110A-N running on the one or more engineering systems 102A-N. For example, if the subscribed engineering system, such as 102A includes an automation engineering application running on the engineering system, then the notification message is generated in the format suitable for the automation engineering application. Similarly, if the subscribed engineering system, such as 102B has an electrical engineering application running on the engineering system, then the notification message is generated in the format suitable for the electrical engineering application and so on. Hence, the notification message is generated based on the subscribed one or more engineering systems 102A-N including one or more engineering applications 110A-N corresponding to various engineering disciplines. The notification message includes the identified one or more modifications in the engineering data. In an embodiment, the notification message includes an object hierarchical view including pointers on the engineering objects that has been modified.

Further, the data handling module 108 causes the processor(s) 202 to send the notification message to one or more engineering systems 102A-N based on the one or more engineering applications 110A-N running on the one or more engineering systems 102A-N. The one or more engineering applications 110A-N corresponds to the one or more engineering disciplines. In an embodiment, the notification message is sent to the subscribed one or more engineering systems. For example, if out of one or more engineering systems 102A-N, only engineering systems 102A-C has subscribed for the notification message with the cloud system 106, then the notification message is sent to only engineering systems 102A-C and not to other systems who have not subscribed. In an embodiment, the notification message may be sent via a standard wireless communication protocol to the one or more engineering systems 102A-N.

In sending the notification message to the one or more engineering systems 102A-N based on the one or more engineering applications 110A-N running on the one or more engineering systems 102A-N, the data handling module 108 causes the processor(s) 202 to determine the one or more engineering applications 110A-N running on the one or more engineering systems 102A-N and then send the notification message to the one or more engineering systems 102A-N based on the determined one or more engineering applications 110A-N running on the one or more engineering systems 102A-N.

In an embodiment, the data handling module 108 further causes the processor(s) 202 to display the notification message on a user interface of the one or more engineering systems 102A-N based on the one or more engineering applications 110A-N running on the one or more engineering systems 102A-N. For example, if the engineering application, for example 110A running on the engineering system, 102A is an automation engineering application, then the notification message is displayed on the user interface of the engineering system 102A so as to be suitable to the automation engineering application, for example 110A.

The data handling module 108 causes the processor(s) 202 to update the engineering data stored locally in the one or more engineering systems 102A-N with the identified one or more modifications based on a user confirmation. For example, upon displaying the notification message to the one or more engineering systems 102A-N, the user of the engineering system, such as 102A-N, may accept the modifications made to the engineering data as displayed in the notification message or reject the modifications made to the engineering data. If the user accepts the modifications made in the engineering data, then the data handling module 108 causes the processor(s) 202 to update the engineering data stored locally in the one or more engineering systems 102A-N with the identified one or more modifications. The modified engineering data is imported from the cloud system 106 into the one or more engineering systems 102A-N. If the user rejects the modifications made to the engineering data, the notification message is discarded in the one or more engineering systems 102A-N.

In an embodiment, the data handling module 108 further causes the processor(s) 202 to receive the engineering data from the one or more engineering systems 102A-N. The engineering data includes a unique identifier associated with the engineering data. In an embodiment, the data handling module 108 causes the processor(s) 202 to determine whether the unique identifier associated with the engineering data matches with at least one unique identifier stored in the storage unit 206. If the unique identifier associated with the engineering data does not match with any one of the unique identifiers stored in the storage unit 206, the data handling module 108 causes the processor(s) 202 to store the engineering data with the unique identifier in the storage unit 206. This is a case where a new engineering data has been received by the cloud system 106 from one among the one or more engineering systems 102A-N. The data handling module 108 cause the processor(s) 202 to send a general notification message to the one or more engineering systems 102A-N. The notification message indicates that the cloud system 106 is updated with the new engineering data and seeking requests for subscription for the newly updated engineering data from the one or more engineering systems 102A-N.

The storage unit 206 may be a non-transitory storage medium that includes engineering file database. The engineering file database of the storage unit 206 stores the reference engineering data, modified engineering data, engineering data, classified engineering data, one or more unique identifiers associated with the engineering data and the like. The storage unit 206 includes various lookup tables for storing the engineering data, version of the engineering data, unique identifier associated with the engineering data, last identified modifications in the engineering data, and other details. Also, the storage unit 206 may correspondingly store the engineering object specific tables for each stored engineering data such as tag tables, device item tables, interface tables, subnet tables and the like. Also, the storage unit 206 stores the subscribed one or more engineering systems 102A-N data that have subscribed for each of the stored engineering data, i.e., for reference engineering data. Also, the storage unit 206 stores the detail of one or more engineering applications 110A-N running on the one or more engineering systems 102A-N.

The input unit 110 may include input devices a keypad, touch-sensitive display, camera (such as a camera receiving gesture-based inputs), etc. capable of receiving one or more input signals, such as user commands to process engineering objects in the DHE 113. The output unit 112 may be a display unit for displaying a graphical user interface that visualizes the representation of the transformed device type in the second data format and the output of the transformed device type in the second data file. The bus 108 acts as interconnect between the processing unit 102, the memory 104, the storage unit 106, the input unit 110, and the output unit 112.

The communication interface 208 is configured for establishing communication sessions between the one or more engineering systems 102A-N and the cloud system 106. The communication interface 208 allows the one or more engineering applications 110A-N to import/import engineering data into the cloud system 106. In an embodiment, the communication interface 208 interacts with the cloud interface at the one or more engineering systems 102A-N for allowing the engineers to access the engineering data and perform one or more operations on the engineering data. The input/output unit 210 may include input devices a keypad, touch-sensitive display, camera (such as a camera receiving gesture-based inputs), etc. capable of receiving one or more input signals, such as user commands to handle engineering data in the data handling module 108. The input/output unit 210 may also be a display unit for displaying a graphical user interface that visualizes the notification messages based on the one or more engineering applications 110A-N. The bus 212 acts as interconnect between various components of the cloud system 106.

Those of ordinary skilled in the art will appreciate that the hardware depicted in FIG. 2 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Disclosed embodiments provide methods and systems that handle engineering data in a multi-engineering-system environment. Disclosed techniques may receive an engineering data from an engineering system; identify one or more modifications in the engineering data based on a reference engineering data; generate a notification message including the identified one or more modifications in the engineering data in a predefined format; and send the notification message to one or more engineering systems based on one or more engineering applications running on the one or more engineering systems.

For simplicity and clarity, the full structure and operation of all data processing systems suitable for use with the present disclosure is not being depicted or described herein. Instead, only so much of a cloud system 106 as is unique to the present disclosure or necessary for an understanding of the present disclosure is depicted and described. The remainder of the construction and operation of the cloud system 106 may conform to any of the various current implementation and practices known in the art.

Figure 3:
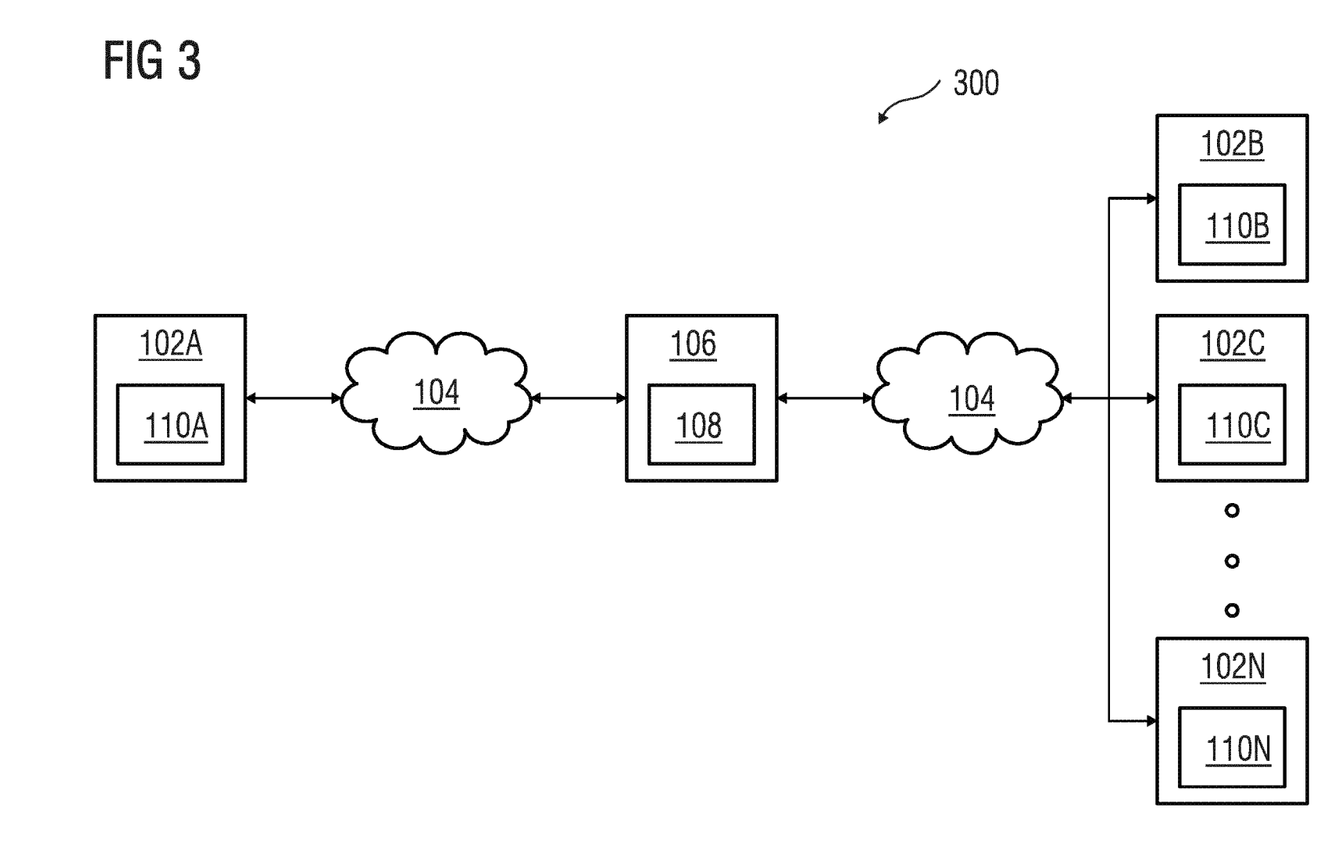
FIG. 3 depicts an exemplary schematic representation of a multi-engineering-system environment capable of handling engineering data according to an embodiment.

FIG. 3 depicts a schematic representation of a multi-engineering-system environment 300 configured for handling engineering data, according to an embodiment. The multi-engineering-system environment 300 includes one or more engineering systems 102A-N communicatively coupled to the cloud system 106 via a network 104. The one or more engineering systems 102A-N include one or more engineering applications 110A-N running on the one or more engineering systems 102A-N. The one or more engineering applications 110A-N corresponds to various engineering disciplines. The cloud system 106 includes a data handling module 108 for handling engineering data in the multi-engineering-system environment 300. In an embodiment, where the engineering system 102A is running an automation engineering application, for example 110A and the engineering system 102B is running an electrical engineering application, for example 110B. Further, considering that the engineering system 102A and the engineering system 102B have subscribed to obtain modification information for engineering data A. The engineering data A is pre-stored in the cloud system 106 that is now the reference engineering data A.

In operation, when the engineering system 102A requests to use the existing reference engineering data A, the engineering system 102A first imports the reference engineering data A from the cloud system 106 to create an automation engineering project A. The engineering system 102A stores a reference link of the automation engineering project A corresponding to the reference engineering data A. The engineering system 102B also requests to use the reference engineering data A from the cloud system 106. In this case, engineering system 102B also imports the reference engineering data A from the cloud system 106 to create an electrical engineering project A. If the engineering system 102B modifies the electrical engineering project A, for example, by adding signal definitions for PLC-1 and save the modified electrical engineering project A locally. Then, the engineering system 102B exports the modified reference engineering data A corresponding to the modified electrical engineering project A into the cloud system 106 through the engineering application 102B.

The cloud system 106 determines whether the received modified engineering project A matches with the reference engineering project A stored in the memory of the cloud system 106. In this case, the reference engineering project A does not match with the modified reference engineering project A as received from the engineering system 102B. Then, the cloud system 106 identifies one or more modifications made in the received modified reference engineering data A by comparing the reference engineering data A with the modified reference engineering data A. Upon identifying the one or more modifications, the cloud system 106 updates the reference engineering data A with the modified reference engineering data A. In an embodiment, the cloud system 106 may request the user of the engineering system 102B to confirm on overwriting the reference engineering data A with the modified reference engineering data A in the memory of the cloud system 106.

Further, the cloud system 106 generates a notification message in a predefined format, where the notification message includes the one or more modifications made in the reference engineering data A. The cloud system 106 sends the notification message to the subscribed engineering system, that in this case is engineering system 102A. The engineering system 102A receives the notification message including the exact modifications made to the reference engineering data A. For example, the engineering system 102A receives information on what device instances or internal object instances are modified in the particular reference engineering data A. Based on the notification message, the engineering system 102A may re-import either the complete reference engineering data A stored at the cloud system 106 or only the modified portions of the reference engineering data A from the cloud system 106. The engineering application 110A handles the overlap of the existing reference engineering data A stored locally in the engineering system 102A with the received reference engineering data A from the cloud system 106.

In case, during the transmission of the notification message from the cloud system 106 to the engineering system 102A, the cloud system 106 detects that the engineering system 102A is offline, then a notification flag is correspondingly set for the reference engineering data A and is stored in the memory of the cloud system 106. Whenever the engineering system 102A is detected to be online again, the cloud system 106 re-sends the notification message to the engineering system 102A.

If an existing reference engineering data is modified by any one of the engineering systems subscribed to the reference engineering data, the same process above repeats and the notification indicating each of the modifications made by any of the engineering systems are propagated to all subscribed engineering systems dynamically as and when the reference engineering data is modified.

Figure 4:
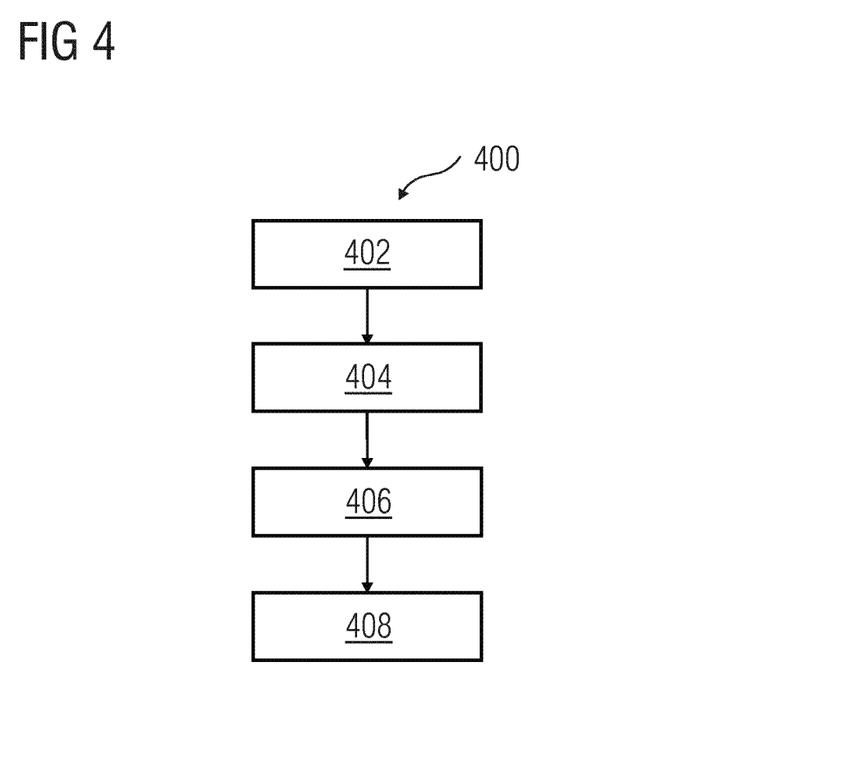
FIG. 4 depicts a process flowchart illustrating a method of handling engineering data in a multi-engineering-system environment according to an embodiment.

FIG. 4 depicts a process flowchart for a method 400 of handling engineering data in a multi-engineering-system environment, such as 100, 300, according to an embodiment. At step 402, an engineering data is received from an engineering system, such as one or more engineering systems 102A-N. The engineering data corresponds to a data format common to one or more engineering disciplines. The engineering data includes an engineering project file, an artifact, one or more object models, device information such as PLC's & I/O Modules, Signal list, network connection information and the like. At step 404, one or more modifications in the engineering data are identified based on a reference engineering data. The one or more modifications in the engineering data include adding at least one engineering object, removing at least one engineering object, modifying engineering object properties, and the like. Further, the reference engineering data is pre-stored in the storage unit 206. The reference engineering data corresponds to last modified version of the engineering data received from one of the one or more engineering systems 102A-N. At step 406, a notification message including the identified one or more modifications in the engineering data in a predefined format is generated. The predefined format may be engineering application specific. At step 408, the notification message is sent to one or more engineering systems 102A-N based on one or more engineering applications 110A-N running on the one or more engineering systems 102A-N. The one or more engineering applications 110A-N corresponds to the one or more engineering disciplines.

Figure 5:
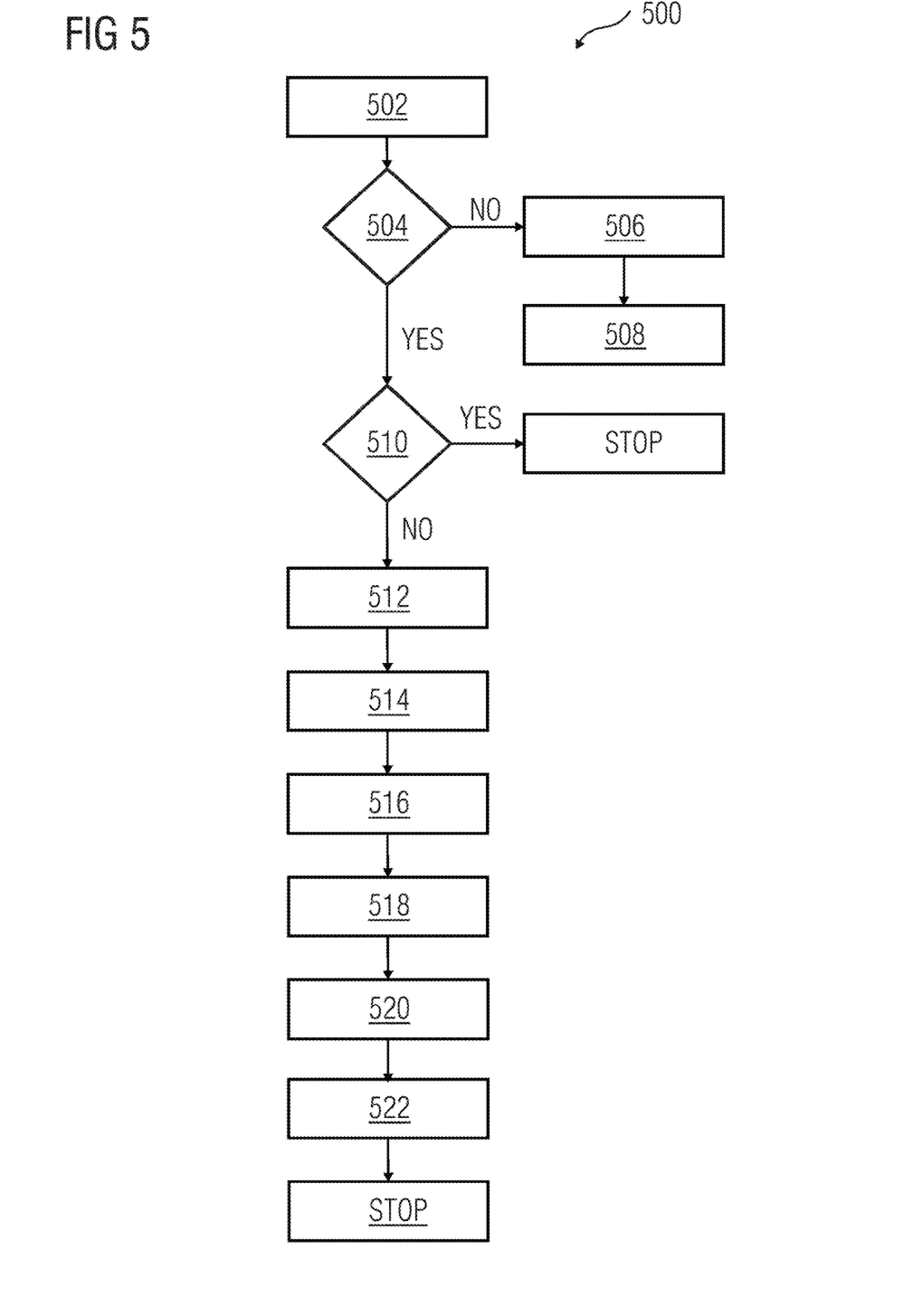
FIG. 5 depicts a detailed process flowchart of a method of handling engineering data in a multi-engineering-system environment according to another embodiment.

FIG. 5 depicts a detailed process flowchart for a method 500 of handling engineering data in a multi-engineering-system environment such as 100, 300, according to an embodiment. At step 502, an engineering data is received from an engineering system, such as the one or more engineering systems 102A-N. The engineering data includes a unique identifier associated with the engineering data. The engineering data includes an engineering project file, an artifact, one or more object models, device information such as PLC's & I/O Modules, Signal list, network connection information and the like. At step 504, it is determined whether the unique identifier associated with the engineering data matches with at least one unique identifier stored in the memory of the cloud system 106. If it is determined that the unique identifier associated with the engineering data does not match with the at least one unique identifier stored in the memory of the cloud system 106, then at step 506, the engineering data is stored with the unique identifier in the memory of the cloud system 106. This is in case the engineering data is a new file or received for the first time by the cloud system 106. Further, at step 508, a notification message is sent to the one or more engineering systems 102A-N. The notification message indicates that the cloud system 106 is updated with the engineering data.

If it is determined that the unique identifier associated with the engineering data matches with the at least one unique identifier stored in the memory of the cloud system 106, then a reference file associated with the matched unique identifier is retrieved from the memory of the cloud system 106. The reference engineering data is pre-stored in the memory of the cloud system 106. The reference engineering data corresponds to last modified version of the engineering data received from one of the one or more engineering systems 102A-N. At step 510, it is further determined whether the contents of the engineering data match with the content of the reference engineering data. If it is determined that the contents of the engineering data do not match with the content of the reference engineering data, then at step 512 one or more modifications made in the engineering data is identified by comparing the contents of the engineering data with the contents of the reference engineering data. The one or more modifications in the engineering data includes adding at least one engineering object, removing at least one engineering object, modifying engineering object properties, and the like. Further, at step 514, the reference engineering data is updated with the engineering data in the memory of the cloud system 106. At step 516, a notification message including the identified one or more modifications in the engineering data is generated in a predefined format. The predefined format may be engineering application specific. At step 518, the one or more engineering applications 110A-N running on the one or more engineering systems 102A-N is determined. At step 520, the notification message is sent to the one or more engineering systems 102A-N based on the determined one or more engineering applications 110A-N running on the one or more engineering systems 102A-N. The one or more engineering applications 110A-N corresponds to the one or more engineering disciplines. At step 522, the notification message is displayed on a user interface of the one or more engineering systems 102A-N based on the one or more engineering applications 110A-N running on the one or more engineering systems 102A-N.

Figure 6A:
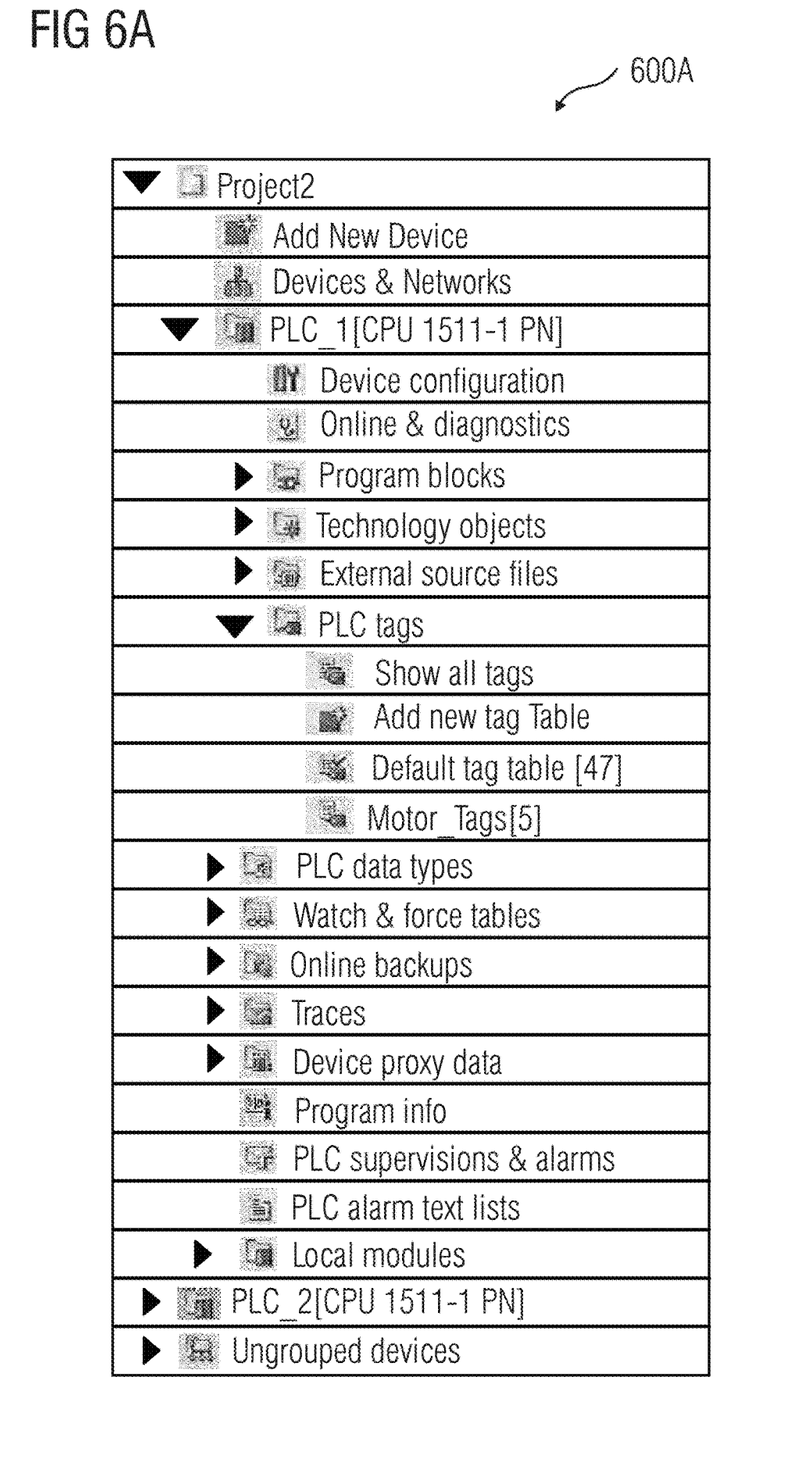
FIG. 6 depicts a screenshot of a graphical user interface for displaying a notification message based on one or more engineering applications running on one or more engineering systems according to an embodiment.
Figure 6B:
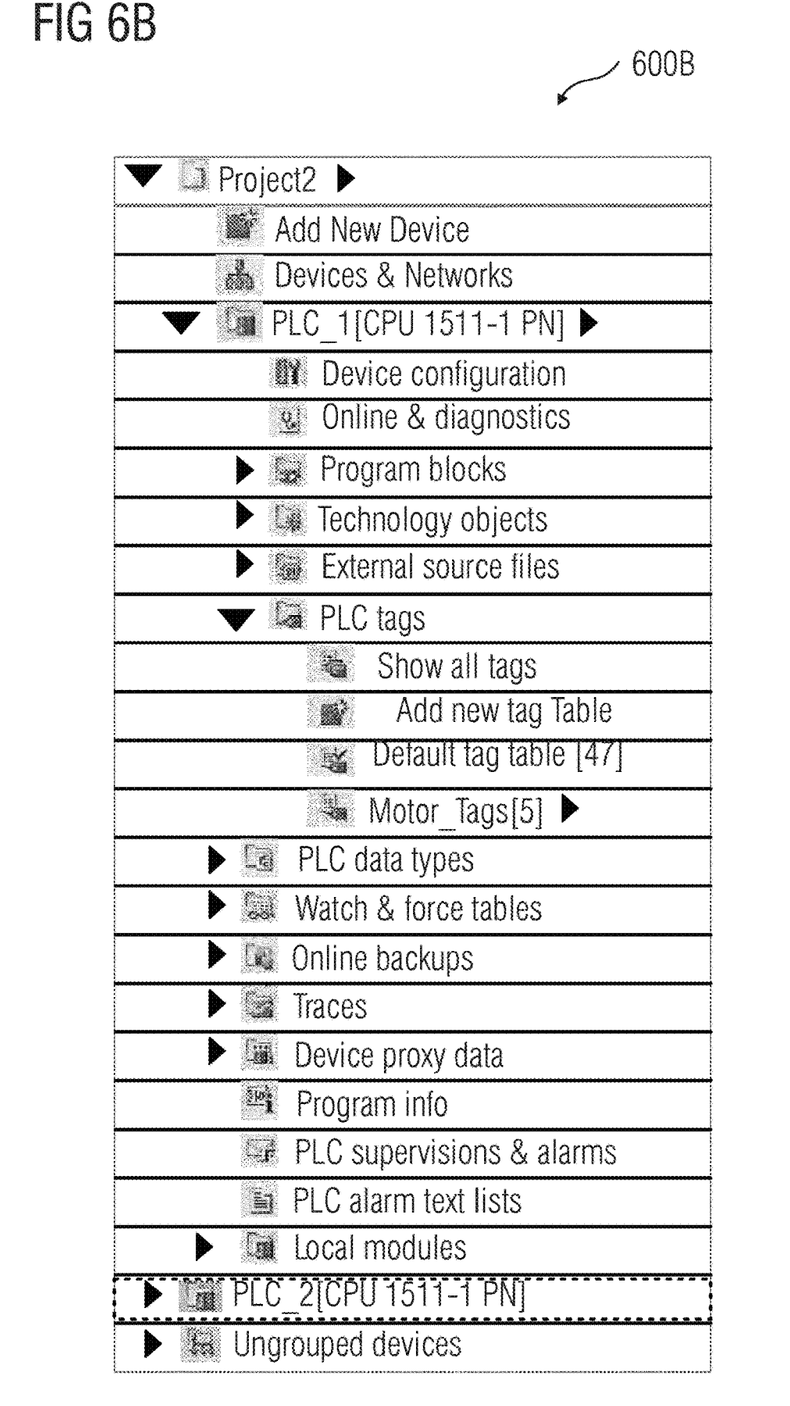

FIG. 6A-B depict screenshots of a graphical user interface for displaying a notification message based on one or more engineering applications 110A-N running on one or more engineering systems 102A-N. FIG. 6A illustrates a normal view of the graphical user interface in an engineering system, such as 102A-N, prior to displaying the notification messages received from the cloud system 106. FIG. 6B illustrates modified view if the graphical user interface in the engineering system, such as 102A-N, after receiving the notification messages from the cloud system 106. For example, the modified view here indicates change in "Motor_Tags" tag table (inside PLC_1). Additionally, Additionally, the graphical user interface may include a tooltip along with the "change icon" displaying information for example, "Tag_1 updated", "Tag_2 added", "Tag_3 deleted" and so on.

FIG. 7 depicts a hierarchical representation 700 of Automation ML file, according to an embodiment. In an embodiment, the Automation ML file includes hierarchy of engineering objects, such as device objects along with several other automation objects and depicts interlinking between these engineering objects. FIG. 7 indicates a "Project" object, that may in turn contain zero or more "Device" objects and zero or more "Subnet" objects. Similarly, a "Device" object might in turn contain zero or more "DeviceItem" object (indicating a Rack or I/O module or such object).

Embodiments may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

While embodiments have been described in detail with reference to certain embodiments, it should be appreciated that the embodiments are not limited to those embodiments. In view of the present disclosure, many modifications and variations would be present themselves, to those skilled in the art without departing from the scope of the various embodiments, as described herein. The scope of the present invention is, therefore, indicated by the following claims rather than by the foregoing description. All changes, modifications, and variations coming within the meaning and range of equivalency of the claims are to be considered within their scope. All advantageous embodiments claimed in method claims may also be apply to system/apparatus claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for handling engineering data in a multi-engineering system environment, the engineering data comprising at least one of an engineering project file, an artifact, one or more object models, devices information, a signal list, or network connection information, the method comprising:
receiving, by a processor, engineering data from an engineering system, wherein the engineering data corresponds to an Automation ML data format common to one or more engineering disciplines, and wherein the engineering data comprises a unique identifier;
determining, by the processor, whether the unique identifier associated with the engineering data matches with at least one unique identifier stored in a memory;
when the unique identifier associated with the engineering data is not determined to match with the at least one unique identifier stored in the memory, storing, by the processor, the engineering data in a storage unit of a cloud system;
when the unique identifier associated with the engineering data is determined to match with the at least one unique identifier stored in the memory, retrieving, by the processor, a reference engineering data from the storage unit of a cloud system;
determining, by the processor, whether the engineering data matches with the reference engineering data;
identifying, by the processor, one or more modifications in the engineering data by comparing the reference engineering data with the engineering data if the engineering data fails to match with the reference engineering data;
determining, by the processor, whether the one or more engineering systems are in an offline state;
setting, by the processor, a notification flag in the reference engineering data, if the one or more engineering systems is determined to be in the offline state;
generating, by the processor, a notification message comprising the identified one or more modifications in the engineering data in a predefined format;
sending, by the processor, the notification message to one or more engineering systems based on one or more engineering applications running on the one or more engineering systems; and
updating, by the processor, the reference engineering data with the engineering data in the storage unit of the cloud system.

2. The method according of claim 1, wherein the one or more engineering applications correspond to the one or more engineering disciplines.

3. The method of claim 1, wherein sending the notification message to the one or more engineering systems based on the one or more engineering applications running on the one or more engineering systems comprises:
determining the one or more engineering applications running on the one or more engineering systems; and
sending the notification message to the one or more engineering systems based on the determined one or more engineering applications running on the one or more engineering systems, wherein the one or more engineering systems are subscribed to receive the notification messages.

4. The method of claim 1, comprising:
displaying the notification message on a user interface based on the one or more engineering applications running on the one or more engineering systems.

5. The method of claim 1, wherein the one or more modifications in the engineering data comprises adding at least one engineering object, removing at least one engineering object, and modifying engineering object properties.

6. The method of claim 1, further comprising:
updating the engineering data stored locally in the one or more engineering systems with the identified one or more modifications based on a user confirmation.

7. The method of claim 1, wherein the reference engineering data is pre-stored in a memory and the reference engineering data corresponds to last modified version of the engineering data received from one of the one or more engineering systems.

8. The method of claim 1, further comprising:
receiving the engineering data from the one or more engineering systems, wherein the engineering data comprises a unique identifier; and storing the engineering data with the unique identifier in the memory if the unique identifier associated with the engineering data fails to match with the at least one unique identifier stored in the memory.

9. The method of claim 8, further comprising:
sending a notification message to the one or more engineering systems, wherein the notification message indicates that the engineering data is updated in the memory.

10. A cloud system for handling engineering data in a multi-engineering-system environment, the cloud system comprising:
a processor; and
a memory coupled to the processor, wherein the memory comprises a data handling module stored in the form of machine-readable instructions executable by the processor, wherein the data handling module is configured to:
receive engineering data from an engineering system, wherein the engineering data corresponds to an Automation ML data format common to one or more engineering disciplines, and wherein the engineering data comprises a unique identifier;
determining, by the processor, whether the unique identifier associated with the engineering data matches with at least one unique identifier stored in the memory;
when the unique identifier associated with the engineering data is not determined to match with the at least one unique identifier stored in the memory, store, the engineering data in a storage unit of a cloud system;
when the unique identifier associated with the engineering data is determined to match with the at least one unique identifier stored in the memory, retrieve, a reference engineering data from the storage unit of a cloud system;
determine whether the engineering data matches with a reference engineering data;
identify one or more modifications in the engineering data by comparing the reference engineering data with the engineering data if the engineering data fails to match with the reference engineering data;
determine whether the one or more engineering systems are in an offline state;
set a notification flag in the reference engineering data, if the one or more engineering systems is determined to be in the offline state;
generate a notification message comprising the identified one or more modifications in the engineering data in a predefined format;
send the notification message to one or more engineering systems based on one or more engineering applications running on the one or more engineering systems; and
update the reference engineering data with the engineering data in the storage unit of the cloud system.

11. A non-transitory computer implemented storage medium that stores machine-readable instructions executable by at least one processor for performing a measuring sequence by a magnetic resonance device, the machine-readable instructions comprising:
receiving engineering data from an engineering system, wherein the engineering data corresponds to an Automation ML data format common to one or more engineering disciplines, and wherein the engineering data comprises a unique identifier;
determining whether the unique identifier associated with the engineering data matches with at least one unique identifier stored in a memory;
when the unique identifier associated with the engineering data is not determined to match with the at least one unique identifier stored in the memory, storing, the engineering data in a storage unit of a cloud system;
when the unique identifier associated with the engineering data is determined to match with the at least one unique identifier stored in the memory, retrieving, a reference engineering data from the storage unit of a cloud system;
determining whether the engineering data matches with a reference engineering data;
identifying one or more modifications in the engineering data by comparing the reference engineering data with the engineering data if the engineering data fails to match with the reference engineering data;
determining whether the one or more engineering systems are in an offline state;
setting a notification flag in the reference engineering data, if the one or more engineering systems is determined to be in the offline state;
generating a notification message comprising the identified one or more modifications in the engineering data in a predefined format;
sending the notification message to one or more engineering systems based on one or more engineering applications running on the one or more engineering systems; and
updating the reference engineering data with the engineering data in a storage unit of a cloud system.

12. A non-transitory computer implemented storage medium of claim 11, wherein the one or more engineering applications correspond to the one or more engineering disciplines.

13. A non-transitory computer implemented storage medium of claim 11, wherein sending the notification message to the one or more engineering systems based on the one or more engineering applications running on the one or more engineering systems comprises:
determining the one or more engineering applications running on the one or more engineering systems; and
sending the notification message to the one or more engineering applications running on the one or more engineering systems, wherein the one or more engineering systems are subscribed to receive the notification messages.

14. The non-transitory computer implemented storage medium of claim 11, wherein the machine readable instructions further comprise:
displaying the notification message on a user interface based on the one or more engineering applications running on the one or more engineering systems.

15. The non-transitory computer implemented storage medium of claim 11, wherein the one or more modifications in the engineering data comprises adding at least one engineering object, removing at least one engineering object, and modifying engineering object properties.

16. The non-transitory computer implemented storage medium of claim 11, wherein the machine-readable instructions further comprise:
updating the engineering data stored locally in the one or more engineering systems with the identified one or more modifications based on a user confirmation.

17. The non-transitory computer implemented storage medium of claim 11, wherein the reference engineering data is pre-stored in a memory and the reference engineering data corresponds to last modified version of the engineering data received from one of the one or more engineering systems.

18. The non-transitory computer implemented storage medium of claim 11, wherein the machine-readable instructions further comprise:
   receiving the engineering data from the one or more engineering systems, wherein the engineering data comprises a unique identifier;
   determining whether the unique identifier associated with the engineering data matches with at least one unique identifier stored in a memory; and
   storing the engineering data with the unique identifier in the memory if the unique identifier associated with the engineering data fails to match with the at least one unique identifier stored in the memory.

19. The non-transitory computer implemented storage medium of claim 18, wherein the machine-readable instructions further comprise:
   sending a notification message to the one or more engineering systems, wherein the notification message indicates that the engineering data is updated in the memory.

* * * * *